US007452521B2

(12) United States Patent
Berg et al.

(10) Patent No.: US 7,452,521 B2
(45) Date of Patent: Nov. 18, 2008

(54) METHOD FOR THE REMOVAL OF MERCURY FROM SULPHURIC ACID WITH THIOSULPHATE PRECIPITATION

(75) Inventors: Dag Berg, Oslo (NO); Jens Nyberg, Kokkola (FI); Aija Rytioja, Kokkola (FI); Heljä Peltola, Pori (FI); Pekka Taskinen, Pori (FI)

(73) Assignee: Outotec OYJ, Epsoo (FI)

( * ) Notice: Subject to any disclaimer, the term of this patent is extended or adjusted under 35 U.S.C. 154(b) by 389 days.

(21) Appl. No.: 10/566,680

(22) PCT Filed: Jul. 16, 2004

(86) PCT No.: PCT/FI2004/000456

§ 371 (c)(1),
(2), (4) Date: Feb. 1, 2006

(87) PCT Pub. No.: WO2005/014472

PCT Pub. Date: Feb. 17, 2005

(65) Prior Publication Data

US 2007/0053827 A1 Mar. 8, 2007

(30) Foreign Application Priority Data

Aug. 12, 2003 (FI) .................................. 20031146

(51) Int. Cl.
*C01B 17/90* (2006.01)
(52) U.S. Cl. .................... 423/522; 423/531; 210/914

(58) Field of Classification Search ................. 423/522, 423/531; 210/914
See application file for complete search history.

(56) References Cited

U.S. PATENT DOCUMENTS

| 3,873,581 | A | * | 3/1975 | Fitzpatrick et al. .......... 552/234 |
| 3,932,149 | A | | 1/1976 | Melkersson |
| 4,354,942 | A | * | 10/1982 | Kaczur et al. ............... 588/256 |
| 4,526,768 | A | * | 7/1985 | Felix et al. .................. 423/531 |
| 5,324,499 | A | * | 6/1994 | Sturgeoff et al. ............ 423/531 |
| 6,228,270 | B1 | | 5/2001 | Houlachi et al. |

FOREIGN PATENT DOCUMENTS

| GB | 1 409 456 A | 10/1975 |
| WO | 84/02123 A1 | 6/1984 |

* cited by examiner

*Primary Examiner*—Timothy C Vanoy
(74) *Attorney, Agent, or Firm*—Buchanan, Ingersoll & Rooney PC

(57) ABSTRACT

This invention relates to a method for removing mercury from dilute sulphuric acid. According to the method sulphuric acid solution is scrubbed with an aqueous solution containing thiosulphate, which precipitates the mercury present in the sulphuric acid solution either as mercury sulphide or, in a chlorine-containing environment, as a mercury sulphide-mercury chloride double salt. The quantity of thiosulphate to be fed is adjusted so that it precipitates the mercury in the sulphuric acid solution, but still does not form elemental sulphur.

11 Claims, 1 Drawing Sheet

METHOD FOR THE REMOVAL OF MERCURY FROM SULPHURIC ACID WITH THIOSULPHATE PRECIPITATION

BACKGROUND

This invention relates to a method for removing mercury from dilute sulphuric acid. According to the method sulphuric acid solution is scrubbed with an aqueous solution containing thiosulphate, which precipitates the mercury present in the sulphuric acid solution either as mercury sulphide or, in a chlorine-containing environment, as a mercury sulphide-mercury chloride double salt. The quantity of thiosulphate to be fed is adjusted so that it precipitates the mercury in the sulphuric acid solution, but still does not form elemental sulphur.

Sulphuric acid is generally manufactured from sulphur dioxide-containing gases such as zinc and copper concentrate roasting and smelter gases. The gases are routed to scrubbing towers, where they are scrubbed with dilute sulphuric acid with a concentration in the region of 35-45 wt %. Mercury is removed from the gases as thoroughly as possible, but some droplets of dilute sulphuric acid solution used in gas scrubbing, with an Hg content of up to 10-20 g/l, also leave in the gas flow from the scrubbing towers. This is equivalent to 7.7-15.3 kg/t $H_2SO_4$ in sulphuric acid with a content of 40 wt %. The proportion of mercury carried in the droplets may be many tens of times greater than gaseous mercury. The thorough removal of mercury from the circulation acid droplets carried along in the gases is therefore crucial in the preparation of top-quality sulphuric acid.

U.S. Pat. No. 6,228,270 describes a method whereby calcium, mercury and selenium are removed from very dilute sulphuric acid used in gas scrubbing. The sulphuric acid content is only 0-50 g/l. Impurities are removed from the solution before it is neutralised and sewered. Calcium is removed from the solution by filtration before the other substances are removed. Mercury is removed from the filtered solution by precipitation with sodium sulphide and selenium is removed by means of sodium dithionite. The precipitated impurities are removed by filtration in the same stage.

GB patent 1409456 describes a method where mercury is removed from concentrated sulphuric acid by adding thiosulphate to the acid and separating the sulphur and other precipitate generated for instance by flotation or filtration. According to the method, thiosulphate always decomposes first into sulphur trioxide and elemental sulphur. The method is based on the principle that as thiosulphate breaks down, the elemental sulphur generated is colloidal and highly reactive, and that it has a wide and active surface. The mercury dissolved in the concentrated sulphuric acid reacts with this colloidal sulphur precipitate. After some time, the sulphur particles agglomerate to a particle size of about 100 μm. The mercury in the acid is precipitated with the sulphur. It is advantageous to feed plenty of thiosulphate (5-10 kg/m³ acid), since it accomplishes the rapid precipitation of sulphur agglomerates. Elemental sulphur and mercury are preferably removed from the sulphuric acid by flotation, where a frother is fed into and air is routed into the acid. The sulphuric acid described in the patent is the end product of an acid plant, concentrated sulphuric acid, of which the lowest mentioned content is 70% and the amount of soluble mercury to be removed is quite small, with an initial content of a maximum of about 25 g/t $H_2SO_4$.

The mercury removal method presented in GB patent 1409456 is based on the decomposition of thiosulphate in concentrated sulphuric acid and the reactivity of the sulphur formed. Thiosulphate is fed abundantly in relation to the amount needed to bind the excess mercury. The text mentions as an example, that there was 3.5 g Hg/t $H_2SO_4$ in the sulphuric acid and that 1 kg of thiosulphate was fed per cubic metre of $H_2SO_4$. As the acid content of the sulphuric acid in this case was 70 wt %, this means that 1 kg of thiosulphate was fed per 1.611 t $H_2SO_4$ (=621 g/t $H_2SO_4$). Expressed as a molar ratio this means that the thiosulphate/mercury ratio is about 140, when the thiosulphate formula is $Na_2S_2O_3.5H_2O$. The precipitating sulphur is removed by flotation, but this is rather a difficult treatment method for concentrated sulphuric acid. The other method mentioned in the example is filtration.

SUMMARY

This invention relates to a method whereby mercury is removed from dilute sulphuric acid by thiosulphate precipitation. Dilute sulphuric acid in this context means an aqueous solution of sulphuric acid with a content generally in the region of 35-45 wt %. This kind of acid is for instance the acid solution used in the scrubbing of gases that contain sulphur dioxide. The Hg content of the sulphuric acid is at least 1 g/l $H_2SO_4$. A thiosulphate alkali metal compound in aqueous solution is routed into the sulphuric acid solution, where the thiosulphate reacts with the mercury in solution forming either mercury sulphide, or if there is also chloride in the scrubbing solution, a mercury sulphide-mercury chloride double salt. Thiosulphate is routed into the scrubbing solution in a molar ratio of maximum 1.0 to the amount of mercury that will prevent the formation of harmful elemental sulphur. The precipitate formed is removed from the sulphuric acid solution typically by filtration.

The essential features of the invention will be made apparent in the attached claims.

When gases containing sulphur dioxide are scrubbed in scrubbing towers with dilute sulphuric acid solution, at least some of the mercury in the gases is also washed out. Mercury thus accumulates in the circulation acid of the scrubbing towers, and when these acid drops get transported along with the gases, they raise the Hg content of the concentrated sulphuric acid under preparation.

Usually there is also some chloride present with the sulphur dioxide-containing gases, so that the mercury in the gases dissolves into the scrubbing solution as mercury chloride and also remains there (dissolved) as chloride. Mercury dissolves in chloride-free scrubbing solutions as sulphate. When the scrubbing solution contains chloride, thiosulphate is routed into it at a molar ratio of a maximum of 0.67 to the amount of mercury, and if the scrubbing solution is chloride-free, thiosulphate is added at a molar ratio of maximum 1.0.

Mercury is generally removed from scrubbing tower circulation acid by precipitation as a suitable compound, insoluble in the scrubbing solution, such as Hg selenide, Hg sulphide or another insoluble mercury salt. Precipitation can be made directly from the scrubbing tower circulation solution, whereby the precipitate generated is removed from the tower as the underflow. Another alternative is precipitation from a side-stream separated from the scrubbing tower, from which the precipitate is removed for example by filtration.

It has now been found that mercury dissolved in dilute sulphuric acid solution can also be removed by precipitation with an alkaline metal thiosulphate salt. For example, sodium thiosulphate, $Na_2S_2O_3.5H_2O$, has proved to be a practical compound. It has also been found in tests that thiosulphate reacts directly with mercury ions, and does not first form an elemental sulphur phase. The following reactions occur when thiosulphate reacts with mercury:

$$3\,HgCl_2 + 2\,Na_2S_2O_3 + 2\,H_2O = 2\,HgS\cdot HgCl_2 + 4\,NaCl + 2\,H_2SO_4 \quad (1)$$

$$HgSO_4 + Na_2S_2O_3 + H_2O = HgS + Na_2SO_4 + H_2SO_4 \quad (2)$$

The decomposition of thiosulphate into elemental sulphur begins only after all the mercury has completely precipitated from the solution. Since elemental sulphur complicates the processing of the precipitate formed in the scrubbing towers, its appearance is not desired. As shown above, in reaction 1 the molar ratio of thiosulphate and mercury is 2/3 and in reaction 2 the molar ratio is 1. When now a sufficient amount of thiosulphate is fed into the circulation acid to make the molar ratio in relation to the mercury in the circulation acid a maximum of 2/3 in a chloride-containing solution and a maximum of 1 in a chloride-free solution, mercury can be removed from the circulation acid without the formation of harmful elemental sulphur.

BRIEF DESCRIPTION OF DRAWING

The invention is described further by means of the following example and FIG. 1, where.

DETAILED DESCRIPTION OF SPECIFIC EMBODIMENTS

EXAMPLE 1

Figure 1:
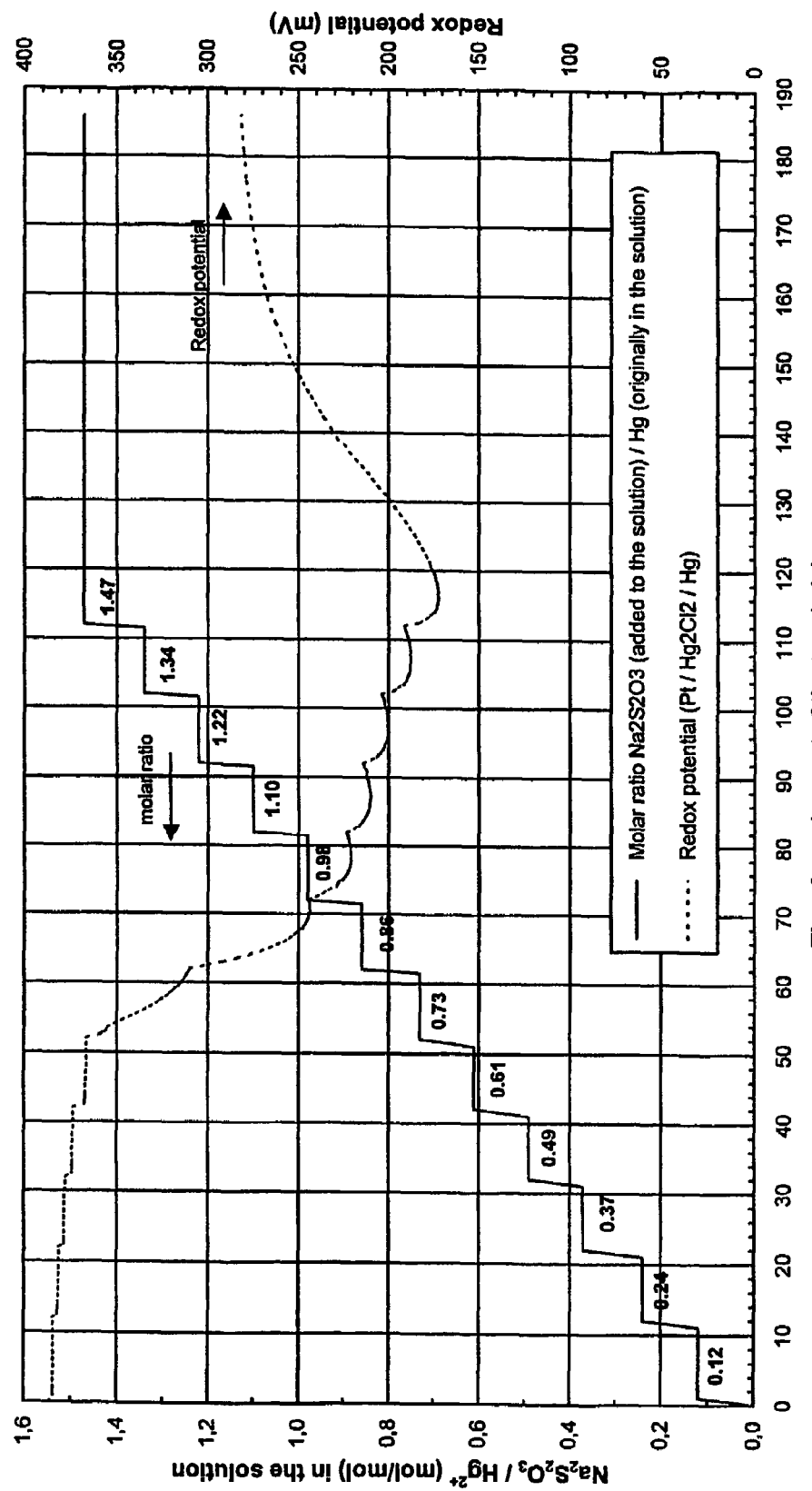
FIG. 1 is a graphical presentation of the precipitation of mercury from sulphuric acid solution using sodium thiosulphate as a function of time at a temperature of 60° C.

A mini-reactor was charged with 2000 ml of dilute sulphuric acid solution, which had been used in the scrubbing of sulphur dioxide-containing gas in scrubbing towers, and contained mercury. The solution was heated in the first and third tests to 60° C. and in the second test the temperature was 25° C. In the first two solutions chloride was included, but not in the third. 42-43 ml of 1-molar sodium thiosulphate solution was added below the surface of the solution at 20-minute intervals. The results are described in Table 1 below.

TABLE 1

| | | Test 1 60° C. | Test 2 25° C. | Test 3 60° C. |
|---|---|---|---|---|
| $H_2SO_4$ (g/l) | | 520 | 472 | 556 |
| $Cl^-$ (g/l) | | 13.3 | 15.3 | — |
| Time (min) | $Na_2S_2O_3/Hg^{2+}$ (mol/mol) | Hg(sol) (g/l) | Hg(sol) (g/l) | Hg(sol) (g/l) |
| 0 | 0 | 16.6 | 17.4 | 17.4 |
| 1 | 0.25 | 11.4 | 12.0 | 7.2 |
| 20 | 0.25 | 11.1 | 11.2 | 7.2 |
| 40 | 0.50 | 5.2 | 3.1 | 0.35 |
| 60 | 0.75 | 0.007 | <0.0001 | <0.0001 |
| 80 | 1.00 | <0.0001 | <0.0001 | <0.0001 |

The results show that the amount of soluble mercury (Hg (sol)) had fallen largely below 0.1 mg/l when the molar ratio of thiosulphate and mercury was 0.75. The Redox-potential measurement carried out during the tests showed that the precipitation of the mercury had, however, finished before this, at a molar ratio of 0.67. This can be seen in the Redox-potential curve of FIG. 1 and the transition point that appears there, corresponding to a molar ratio of 0.67. X-ray diffraction analysis proved that mercury precipitates from a chloride-containing scrubbing solution in the form $\alpha$—$Hg_3S_2Cl_2 = 2HgS\cdot HgCl_2$. The compound is known as a natural mineral called corderoite. Mercury precipitates from a chloride-free solution as the sulphide HgS. During the tests there was no sign of sulphur generation until the thiosulphate/mercury molar ratio exceeded 0.75.

As the example shows, the method can be used to remove mercury from dilute sulphuric acid fairly well, as in the worst case the mercury content was 7 mg/l and in most tests it was less than 1 mg/l. If we calculate roughly that the amount of mercury remains between 1-5 mg/l, this corresponds to a content of 1-4 ppm in sulphuric acid with a content of 40 wt %. Thus the method has achieved its objective, i.e. the removal of mercury from a dilute sulphuric acid solution.

The invention claimed is:

1. A method for the removal of mercury from a dilute aqueous solution of sulphuric acid, comprising:
   feeding an aqueous solution of thiosulphate alkali metal compound into an aqueous solution of sulphuric acid with an acid content of 35-45 wt % and an Hg content of at least 1 g/l, wherein the molar ratio of added thiosulphate to the amount of mercury dissolved in the acid solution is, at maximum, 1.0,
   reacting at least some of the mercury dissolved in the acid solution with the thiosulphate, and
   precipitating reacted mercury from the acid solution.

2. A method according to claim 1, wherein the mercury is precipitated as mercury sulphide (HgS).

3. A method according to claim 1, wherein the aqueous solution of sulphuric acid contains chloride ions, and wherein the mercury is in solution as mercury chloride.

4. A method according to claim 3, wherein the molar ratio of added thiosulphate to the amount of mercury dissolved in the acidic solution is, at maximum, 0.67.

5. A method according to claim 3, wherein the mercury is recovered as a double salt $2HgS$—$HgCl_2$.

6. A method according to claim 1, wherein the thiosulphate alkali metal compound is sodium thiosulphate, $Na_2S_2O_3\cdot 5H_2O$.

7. A method according to claim 1, further comprising recovering the precipitated mercury as a sediment by filtration.

8. A method according to claim 1, wherein the aqueous solution of sulphuric acid is a scrubbing tower circulation solution.

9. A method according to claim 1, wherein the formation of elemental sulphur does not occur.

10. A method according to claim 8, further comprising removing precipitated mercury from the solution as a scrubbing tower underflow.

11. A method according to claim 8, further comprising removing precipitated mercury from the solution by filtering a scrubbing tower side-stream.

* * * * *